(12) United States Patent
Drerup et al.

(10) Patent No.: US 7,174,410 B2
(45) Date of Patent: Feb. 6, 2007

(54) METHOD, APPARATUS AND COMPUTER PROGRAM PRODUCT FOR WRITE DATA TRANSFER

(75) Inventors: Bernard Charles Drerup, Austin, TX (US); Harm Peter Hofstee, Austin, TX (US); Wendel Glenn Voigt, Pflugerville, TX (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 10/418,593

(22) Filed: Apr. 17, 2003

(65) Prior Publication Data

US 2004/0221086 A1 Nov. 4, 2004

(51) Int. Cl.
  G06F 13/40 (2006.01)
  G06F 13/42 (2006.01)
  G06F 13/20 (2006.01)
  G06F 13/14 (2006.01)
(52) U.S. Cl. .................. 710/315; 710/105; 710/313
(58) Field of Classification Search .............. 710/105, 710/107, 110, 306, 310, 315, 313, 316
  See application file for complete search history.

(56) References Cited

U.S. PATENT DOCUMENTS

| | | | | |
|---|---|---|---|---|
| 5,367,695 A | * | 11/1994 | Narad et al. ............ | 709/210 |
| 5,734,850 A | * | 3/1998 | Kenny et al. ............ | 710/306 |
| 5,761,450 A | * | 6/1998 | Shah ..................... | 710/107 |
| 5,802,324 A | * | 9/1998 | Wunderlich et al. ..... | 710/300 |
| 5,878,239 A | * | 3/1999 | Furuta .................. | 710/315 |
| 5,918,026 A | * | 6/1999 | Melo et al. ............. | 710/314 |
| 6,256,685 B1 | * | 7/2001 | Lott ..................... | 710/52 |
| 6,449,678 B1 | * | 9/2002 | Batchelor et al. ........ | 710/310 |
| 6,633,933 B1 | * | 10/2003 | Smith et al. ............ | 710/74 |

OTHER PUBLICATIONS

Tanenbaum, Andrew; "Structured Computer Organization"; Third Edition; Prentice-Hall Inc., 1990; pp. 11-13.*
Stallings, William; "Data & Computer Communications"; Sixth Edition; Prentice-Hall Inc., 2000; pp. 198-200, 209-212.*
PCI Special Interest Group; "PCI Local Bus Specification"; PCI Special Interest Group; Revision 2.3; Mar. 29, 2002; pp. 43, 48, and 61-67.*
PCI Special Interest Group; "PCI-to-PCI Bridge Architecture Specification"; PCI Special Interest Group; Revision 1.1; Dec. 18, 1998; pp. 74-77.*

* cited by examiner

Primary Examiner—Rehana Perveen
Assistant Examiner—Ryan M. Stiglic
(74) Attorney, Agent, or Firm—Diana L. Roberts; Anthony V. S. England

(57) ABSTRACT

A first device is operable to communicate on an bus according to a first protocol. A bridge is also operable to communicate on the bus according to the first protocol. A second device is coupled to the bus via the bridge and operable to communicate according to a second protocol. The bridge has a memory for holding data received from the second device and is operable to translate from the second to the first protocol. The second device sends write data responsive to receiving a ready signal from the bridge, and includes memory for holding the write data that the second device has sent, but for which completion has not been signaled. The second device re-sends the write data from the memory responsive to receiving a non-completion signal via the bridge, and releases the memory for the data responsive to receiving a completion signal via the bridge.

20 Claims, 2 Drawing Sheets

METHOD, APPARATUS AND COMPUTER PROGRAM PRODUCT FOR WRITE DATA TRANSFER

BACKGROUND

1. Field of the Invention

The present invention relates to transferring data between an initiator and target over a bus, and more particularly concerns such transfers via a bridge that translates between a first and second protocol.

2. Related Art

It is often desirable to develop new computer systems that have improvements in some aspects of the systems, but which selectively reuse some components, or at least minimize changes to some of the components. For example, computer systems commonly include master (a.k.a. "initiator") and target devices that transfer data over a system bus. In a new release of such a system, it may be desirable to adopt a new or modified bus protocol without changing, or at least minimally changing, certain intitiator or target devices. This may include maintaining support of old bus protocols for the initiator and target devices.

A "protocol" is defined as a "set of formal rules describing how to transmit data. Low level protocols define the electrical and physical standards to be observed, bit- and byte-ordering and the transmission and error detection and correction of the bit stream. High level protocols deal with the data formatting, including the syntax of messages, the terminal to computer dialogue, character sets, sequencing of messages etc. Protocols are defined, for example, in Peripheral Component Interconnect ("PCI") specifications published by the PCI special interest group, available at www-.pcisig.com, and in IBM CoreConnect bus architecture specifications, elements of which include the processor local bus (PLB), the on-chip peripheral bus (OPB), a bus bridge, and a device control register (DCR) bus, defined in specifications available at www.ibm.com. The PCI specifications and CoreConnect specifications are hereby incorporated herein by reference. One conventional approach for addressing these objectives is to require new devices to recognize when they're transferring data to or from an old device and perform the transfer using the old protocol, which the old device still uses. This convention has at least two drawbacks. First, the new devices have increased complexity, because they must support both the old and new protocols. Secondly, when an old protocol device participates in a transfer on the bus, the transfer is typically done at the speed of the old bus. However, the new protocol typically supports higher speed transfers, so this fails to take advantage of the increased speed of the new protocol.

A second approach for addressing these objectives is to provide a "bridge" that converts transfer from the old protocol to the new protocol, and vice versa. This is advantageous from the standpoint that it does not require new devices to support the old protocol.

A bridge may be "simple" or "complex," depending on how it handles write transactions. A complex bridge performs "write posting" in which the bridge signals to a write initiator the progress, or even completion, of a write transfer before the bridge receives an indication of progress or completion from the destination bus. In a more extreme case, the bridge may even signal progress or completion before the bridge has even sent the write data to the destination. Because write posting involves the bridge gathering and holding data for and information about a write transfer, it allows the bridge to transmit the write data on the destination bus at a speed that is more nearly optimal for that bus. However, write posting also has some drawbacks. First, in this context it is important to maintain necessary ordering requirements for system transfers. For example, ordering logic must be built in to prevent execution of certain read transactions after a bridge has accepted but before the bridge has completed certain write transactions. This logic, of course, adds complexity to the system and may also increase latency. For example, a complex bridge may hold up a transaction due to an ambiguity, although the transaction could actually proceed.

A simple bridge does not include buffering and does not post write transactions nor signal progress to an initiating device until progress has been signaled to the bridge from the target device. This eliminates the ordering problems described above, but results in failure, once again, to take full advantage of the increased speed of the new protocol. That is, an initiator device of the old type, using the old protocol, is only capable of sending data at the slower speed of the old protocol. Since the initiator device using a simple bridge does not sent write data until the target is ready to receive it, once the old initiator is granted control of the bus for the write transfer the bus is monopolized by the transfer for the longer interval required for the slower transfer rate.

Based on the above, it should be appreciated that a need exists for and need exists for improvements in data transfer from one protocol to another.

SUMMARY OF THE INVENTION

The forgoing need is addressed in the present invention. According to one form of the invention, an apparatus for communicating among devices on a bus includes a bus and a first device coupled to the bus and operable to communicate on the bus according to a first protocol. The apparatus also includes a bridge coupled to the bus operable to communicate on the bus according to the first protocol and a second device coupled to the bus via the bridge. The second device is operable to communicate according to a second protocol. The bridge has a memory for holding data received from the second device and is operable to translate from the second to the first protocol. The second device includes logic operable for sending write data for a transaction responsive to receiving a certain ready signal from the bridge, and includes memory for holding the write data that the second device has sent for the transaction, but for which completion has not been signaled. The logic of the second device is also operable for re-sending the write data held in the memory responsive to receiving at least one certain non-completion signal, and for releasing the memory for the data responsive to receiving a completion signal.

It should be appreciated that according to the invention the bridge is capable of converting transfers from an old protocol, e.g., that of the above "second device", to a new protocol, e.g., that of the above "first device," and the bridge has memory for buffering write data from the old protocol device, but the bridge does not post writes and therefore does not have all the complexity of the ordering logic of a complex bridge. Instead, to support a certain enhancement in the old protocol between the device and the bridge an initiator device using the old protocol is enhanced with logic that is relatively more simple than the ordering logic of a complex bridge and uses existing or enhanced memory for buffering a write data transfer. According to this enhanced protocol, write data is transferred from the initiator device to the bridge buffer simply in response to a ready signal from the bridge, without first receiving an acknowledgment or ready signal from the target device. Moreover, the bridge does not signal completion or progress of the data transfer to the initiator until the target device signals the completion or progress to the bridge, so there is no premature signaling of completion or progress and therefore the need for complex ordering logic does not arise and performance is enhanced. Thus, according to the invention the design of old-protocol initiator devices is somewhat enhanced, but not necessarily so completely altered as to support a new protocol in its entirety. Additional aspects, objects, advantages and other forms of the invention will become apparent upon reading the following detailed description and upon reference to the accompanying drawings.

DETAILED DESCRIPTION OF A PREFERRED EMBODIMENT

The claims at the end of this application set out novel features which applicant believes are characteristic of the invention. The invention, a preferred mode of use, objectives and advantages, will best be understood by reference to the following detailed description of an illustrative embodiment read in conjunction with the accompanying drawings.

Figure 1:
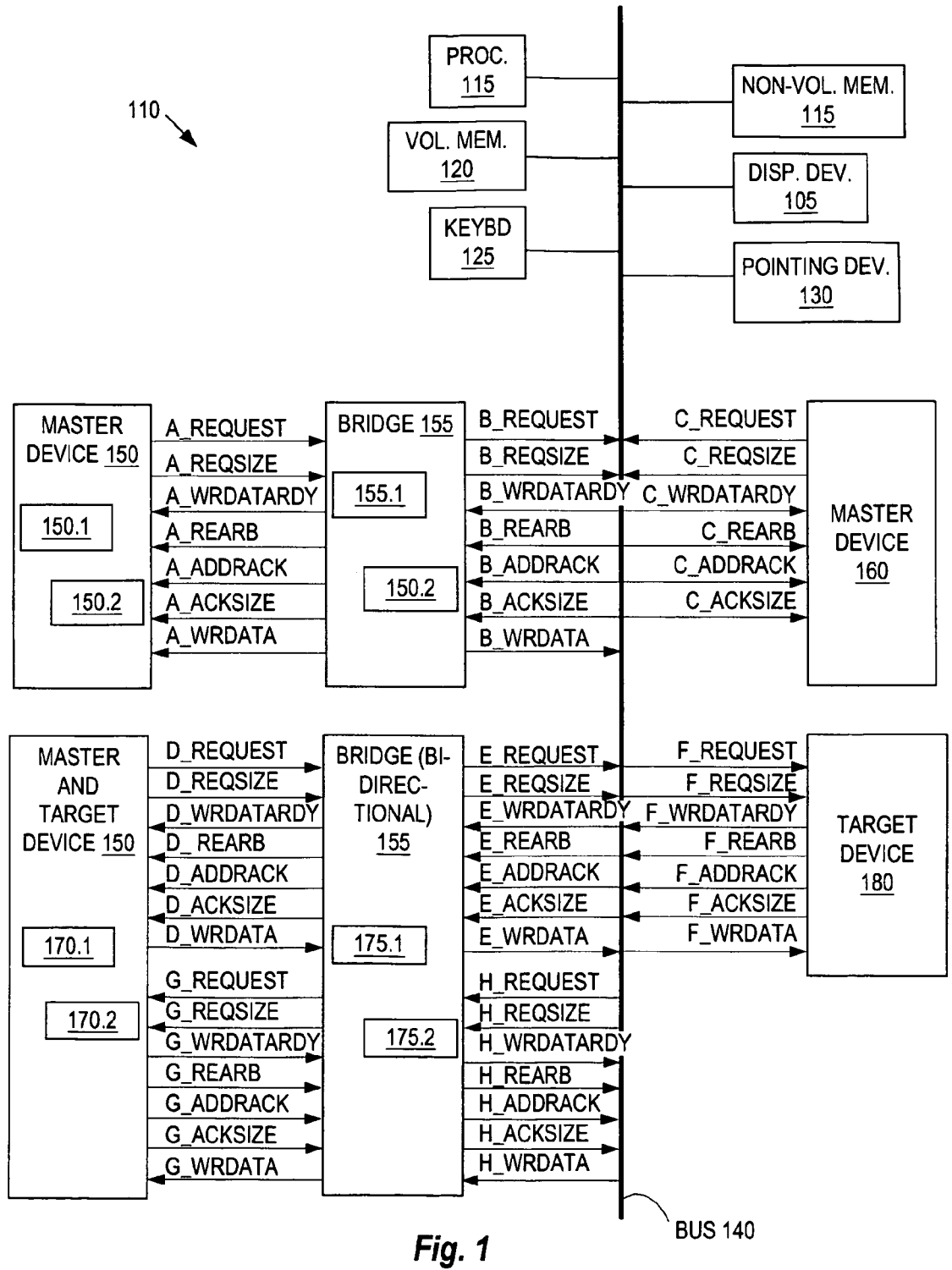
FIG. 1 illustrates a block diagram of a computer system 110, according to an embodiment of the present invention.

Referring to FIG. 1, a block diagram illustrating a computer system 110 is shown, according to an embodiment of the present invention. The system 110 includes a processor 115, a volatile memory 120, e.g., RAM, a keyboard 125, a pointing device 130, e.g., a mouse, a nonvolatile memory 135, e.g., ROM, hard disk, floppy disk, CD-ROM, and DVD, and a display device 105 having a display screen. Memory 120 and 135 are for storing program instructions, which are executable by processor 115, to implement various embodiments of a method in accordance with the present invention. Components included in system 110 are interconnected by bus 140. A communications device (not shown) may also be connected to bus 140 to enable information exchange between system 110 and other devices.

Also shown are a master device 150 coupled to the bus 140 via bridge 155, a master and target device 170 coupled to the bus 140 via bridge 175, a master device 160 coupled directly to the bridge 140 and a target device 180 coupled directly to the bridge 140. In FIG. 1 the master devices 150 and 160, target device 180 and master and target device 170 are explicitly labeled to emphasize their functions as such, but it should be understood that the processor 115, memory 135, etc. are also master, target or master and target devices. Master device 150, being a master but not a target device, is shown with only one set of control lines A_REQUEST, A_REQSIZE, A_WRDATARDY, A_REARB, A_ADD-ACK, and A_ACKSIZE, along with write data lines A_WR-DATA. (It should be understood that there are additional control, address and data lines for each of the devices that are not shown.) In contrast, master and target device 170 is capable of bi-directional data transfers and therefore is shown with a set of data and control lines "D" in one direction and another set "G" in another direction. Similarly, bridge 155 is shown with one set of data and control lines "B" between the bridge 155 and the bus 140, whereas bridge 175 is shown with two sets, "E" and "H." Likewise, master device 160 shown with one set of data and control lines "C," and target device 180 is shown with one set of data and control lines "F."

The control lines mentioned above are for the following signals:

REQUEST: a signal that a master sense to its bridge to indicate the desire to transfer write data. REQSIZE: a bus of signals a master sends to its bridge to indicate the desired size of the write transfer.

WRDATARDY: a signal a bridge sends to its master to tell the master to send write data. This signal is asserted by the bridge in response to the bridge receiving a write request.

REARB: a signal a bridge sends to its master to tell the master that there has been a retry request for a write transaction.

ADDRACK: a signal a bridge sends to its master to tell the master that a write transaction is complete. This signal is asserted by the bridge in response to receiving the same signal from the target device for the transaction.

ACKSIZE: a bus of signals a bridge sends to a master to tell the master how much of a write data transaction has been completed. This signal is asserted in conjunction with ADDRACK.

Devices 150 and 170 are legacy devices that communicate using an older protocol than the protocol of devices 160 and 180 supported by the bus 140. Consequently, devices 160 and 180 are operable to communicate on the bus 140 using a different protocol than that of devices 150 and 170. For this reason the bridges 155 and 175 are interposed between devices 150 and 170, respectively, and the bus 140. Bridge 155 is capable of translating the older protocol of communication received from device 150 to the newer protocol for communicating on the bus 140 to devices such as device 180. Similarly, bridge 175 is capable of translating the older protocol of communication received from device 170 to the newer protocol for communicating on the bus 140. Since bridge 175 and its associated legacy device 170 are bi-directional, bridge 175 is capable of translating not only from the older protocol to the newer protocol but also from the newer protocol to the older protocol, such as for a data transfer from device 160 to device 170.

Bridge 155 has memory 155.2 for buffering a least some of the write data received from master 150 in a transaction. This is not for the purpose of re-sending in the event of a retry-type event (as would be the case for a complex bridge), but rather merely because the master 150 uses the older protocol and is therefore not capable of transferring data at as high a transfer rate as that of the newer protocol supported by the bus 140 and devices such as master device 160 and target device 180. That is, the memory 155.2 is for the purpose of accumulating at least some of the data from the master 150 for a write transaction before the bridge 155 transfers the data over the bus 140. Then, when the bridge 155 has accumulated enough of the data so that the memory 155.2 will not under flow, the bridge 155 may initiated transfer on the bus 140 at the higher data transfer rate supported by the newer protocol.

According to the embodiment of the invention here illustrated, the legacy master device 150 is enhanced with memory 150.2 or already contains memory and is enhanced with logic to use the memory for holding write data sent by the master 150 until such time as the master 150 receives an indication on one or more of its control lines that the transfer has been successfully completed, as will be described further herein below. Also, the device 150 may receive an indication that some or all of the write data for a transaction needs to be re-sent, in which case the write data held in the memory 150.2 is again sent by the master 150, as will be described further herein below. Likewise, the master and target device 170 has memory 170.2 for holding write data that it sends until such time as device 170 receives an indication that the transfer has been completed, etc.

Similarly, according to the embodiment of the invention here illustrated the legacy master device 150 is has logic 150.1 to support a certain enhancement in the old protocol between the device 150 and the bridge 155. The logic 150.1 in the master 150 and logic 155.1 in the bridge 155 is relatively more simple and higher performing than the ordering logic of a complex bridge. The same applies to logic 170.1 of device 170 and logic 175.1 of bridge 175. As was stated in the Summary herein above, according to this enhanced protocol write data is transferred from an initiator device such as 150 to the bridge 155 buffer simply in response to a ready signal from the bridge 155, without first receiving an acknowledgment from the target device, such as device 180. However, the bridge 155 does not signal completion or progress of the data transfer to the initiator device 150 until the target device 180 signals the completion or progress to the bridge 155, so there is no premature signaling of completion or progress and therefore the need for complex ordering logic does not arise.

Figure 2:
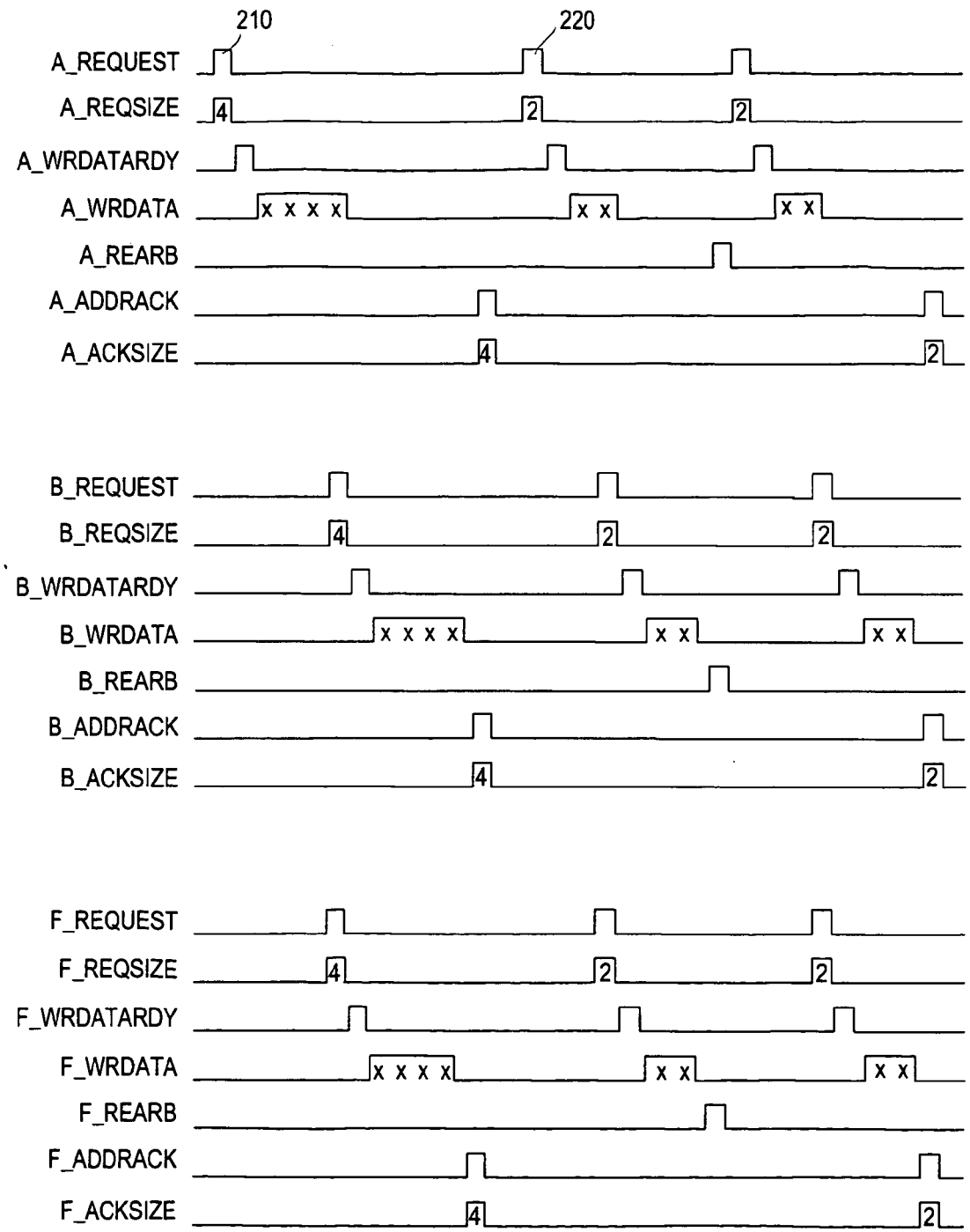
FIG. 2 illustrates a timing diagram for selected write data transfers, according to an embodiment of the present invention.

Referring now to FIG. 2, in which time proceeds from left to right, details are illustrated concerning how the earlier described signals are used to facilitate data transfers, and concerning the timing of the signals. Beginning at the first event 210 indicated in FIG. 2 for a first write transaction, and referring also to FIG. 1, device 150 initiates a write transaction by asserting the A_REQUEST signal to bridge 155 along with a value on the A_REQSIZE lines. In the instance illustrated the size of the requested transfer is four data units. (It should be understood that a data unit could be any predetermined number of bits or bytes.) In response, bridge 155 asserts the A_WRDATARDY signal to the master 150. Responsively, the master 150 asserts the four data units of data to the bridge 155 on the A_WRDATA bus.

The bridge 155 buffers at least some of the data before asserting a request on the B_REQUEST line, thereby requesting to write data on bus 140 to target device 180, together with asserting the request size on the B_REQSIZE lines. (It should be understood that the request is directed to the target device 180 by means of signals on address lines not shown.) These signals are asserted across the bus 140 and on the F_REQUEST and F_REQSIZE lines, as shown. In response, the target device 180 asserts the F_WRDATARDY signal, which is asserted across the bus 140 and on the B_WRDATARDY line or lines, as shown.

In response to receiving the ready signal, B_WRDATARDY, the bridge 155 writes the four data units of data on the B_WRDATA bus. These data signals are asserted across the bus 140 and on the F_WRDATA lines, as shown.

Target device 180 signals completion, responsive to the device 180 determining that it can accept all the data, by asserting the F_ADDRACK and F_ACKSIZE signals. Since in the illustrated instance all four data units are received, the F_ACKSIZE signal indicates a value of four, as shown, which is the same value as the initial request size. The F_ADDRACK and F_ACKSIZE signals are asserted across the bus 140 and on the B_ADDRACK and B_ACKSIZE lines.

In response to receiving the indication of completion, bridge 155 asserts the A_ADDRACK and A_ACKSIZE signals to the initiator, master device 150. The master device 150 compares the value indicated by the A_ACKSIZE signals to the value initially asserted by the master 150 on A_REQSIZE and determines that in this instance they are the same and therefore memory 150.2, which is holding all the write data that the master 150 originally sent for this transaction, can now be released. That is, the memory 150.2 may be flushed now or overwritten in the next transaction.

Next, at 220, another write transaction is initiated by master device 150 by asserting the A_REQUEST signal to bridge 155 along with a value on the A_REQSIZE lines. In this new instance illustrated, the size of the requested transfer is two data units. In response, bridge 155 asserts the A_WRDATARDY signal to the master 150. Responsively, the master 150 asserts the two data units of data to the bridge 155 on the A_WRDATA bus.

The bridge 155 buffers at least some of the data before asserting a request to target device 180 on bus 140 to write the data on the B_REQUEST line together with asserting the request size on the B_REQSIZE lines. (The request is again directed to the target device 180 by means of signals on address lines not shown.) These signals are asserted across the bus 140 and on the F_REQUEST and F_REQSIZE lines, as shown. In response, in this instance the target device 180 is busy and therefore asserts the F_REARB signal, which is asserted across the bus 140 and on the B_REARB line or lines, as shown. This is a type of non-completion signal and indicates that the transaction should be retried at a later time. (It should also be understood that the transaction may have a tag signal asserted on lines not shown, and that the target device 180 may assert the tag in connection with any response it sends back to the initiator device 150, such as the retry signal, F_REARB, or the completion signals, F_ADDRACK AND F_ACKSIZE.)

In response to receiving the retry signal, B_REARB, the bridge 155 releases memory 155.2 allocated to the two data units of data that were received for the current transaction and asserts the A_REARB signal to the master 150.

In response to receiving the A_REARB signal, master device 150 re-initiates the second write transaction by re-asserting the A_REQEST signal to bridge 155 along with the two-bit value on the A_REQSIZE lines. Responsively, the bridge 155 again asserts the A_WRDATARDY signal to the master 150 and the master 150 again writes the two data units of data to the bridge 155 on the A_WRDATA bus. This time the data is obtained from the memory 150.2, where it was stored in connection with the first attempt at this transaction and where it will continue to be held until such time as the initiator device 150 receives a completion indication for the transaction.

The bridge 155 again buffers at least some of the data before asserting a request to target device 180 on bus 140 to write the data on the B_REQUEST line together with asserting the request size on the B_REQSIZE lines. These signals are again asserted across the bus 140 and on the F_REQUEST and F_REQSIZE lines, as shown. In response, the target device 180 asserts the F_WRDATARDY signal, which is asserted across the bus 140 and on the B_WRDATARDY line or lines, as shown.

In response to receiving the ready signal, B_WRDATARDY, the bridge 155 writes the two data units of data on the B_WRDATA bus. These data signals are asserted across the bus 140 and on the F_WRDATA lines, as shown.

Target device 180 signals completion, in response to determining this time that it can receive all the data, by asserting the F_ADDRACK and F_ACKSIZE signals. Since in the illustrated instance two data units are received, the F_ACKSIZE signal indicates a value of two, as shown, which is the same value as the initial request size, at 220. The F_ADDRACK and F_ACKSIZE signals are asserted across the bus 140 and on the B_ADDRACK and B_ACKSIZE lines.

In response to receiving the indication of completion, bridge 155 asserts the A_ADDRACK and A_ACKSIZE signals to the initiator, master device 150. The master device 150 compares the value indicated by the A_ACKSIZE signals to the value initially asserted by the master 150 on A_REQSIZE and determines that in this instance they are the same and therefore memory 150.2, which is holding all the write data that the master 150 originally sent for this transaction, can now be released. That is, the memory 150.2 may be flushed now or overwritten in the next transaction.

It should be understood that logical steps described above that are accomplished by the master device 150 are implemented in logic 150.1, according to an embodiment of the present invention. Likewise, logical steps described above that are accomplished by the bridge 155 are implemented in logic 155.1, according to an embodiment of the present invention.

It should also be understood that with respect to write transactions initiated by master and target device 170, the device 170 and bi-directional bridge 175 operate in similar fashion to that described above for master device 150 and bridge 155, and logical steps for these devices 170 and 175 are implemented in logic 170.1 and 175.1, respectively, according to an embodiment of the present invention.

In various embodiments system 110 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C++ objects, Java and Microsoft Foundation Classes (MFC).

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, the invention applies also to a "system" which does not necessarily include a processor. That is, a master and target may communicate across a bus without involvement of a processor. Furthermore, transferring data on a bus may include transferring data across a network.

In one variation, another type of non-completion arises in which some, but not all, data for a write transaction is successfully transferred to a target device. This circumstance is signaled by the target device asserting ADDRACK and ACKSIZE signals, wherein the value indicated by the ACKSIZE signals is less than the number of data units, etc. that was sent by the initiator. The initiator detects this non-completion by comparing the value received from the target device to the value that the target sent in the initial REQSIZE signal. The initiator then re-sends the remaining data units, etc. that were not successfully transmitted in the first attempt, but does not necessarily re-send the initial data units, etc. indicated as having been received. Likewise, the bridge for the initiator detects this non-completion from the ADDRACK signal. The bridge does not compare the value received from the target device to the value that the target sent in the initial REQSIZE signal. It simply releases or flushes memory 155.2 allocated to the transaction.

The invention has been described in the context of a single computer system 110 (FIG. 1). However, it should be understood that the invention is equally applicable to transfers from one computer system to another, such as across a network. In such an embodiment of the invention, a master device may itself include a computer system, as may a target device. A bridge from the master device to a bus or network may be internal to the computer system of the master device, may be part of the bus or network, or may be external to both the master and the bus or network.

Referring again to FIG. 1, it should be understood that the logic 170.1 includes functions to permit master and target device 170 to send write data as a master, as described herein above for device 150, and also to permit the device 170 to receive write data as a target, as described herein above for device 180.

Also, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet. To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. An apparatus for communicating among devices on a bus, the apparatus comprising:
   a bus;
   a first device coupled to the bus and operable to communicate on the bus according to a first protocol;
   a bridge coupled to the bus and operable to communicate on the bus according to the first protocol;
   a second device coupled to the bus via the bridge and operable to communicate on the bus according to a second protocol, wherein the bridge is operable, in response to a request generated by the second device to write data to the first device, to send a certain ready signal to the second device without the bridge first receiving an acknowledgment from the first device that the first device is ready to receive the data, the bridge having memory for holding the data received from the second device and being operable to translate from the second protocol to the first protocol, and wherein the second device includes:
      logic operable for requesting to send data for a transaction and then sending multiple beats of the data responsive to receiving the certain ready signal from the bridge and without receiving the acknowledgment from the first device for the write request; and
      device memory for holding the data that the second device has sent for the transaction, but for which completion has not been signaled, wherein the logic is also operable for re-sending the data held in the device memory responsive to receiving at least one certain non-completion signal, and for releasing the device memory for the data responsive to receiving a completion signal;

wherein the first device has logic operable for determining that the first device is able to receive the data for the transaction and for responsively sending the completion signal to the bridge, wherein the bridge is operable to send the completion signal to the second device for the transaction only in response to the first device sending the completion signal to the bridge, and wherein the second device sends the data and the first device receives the data at different rates without the first device signaling the certain non-completion signal and without the second device repeating the data sending, but the second device repeats the data sending in response to the first device signaling the certain non-completion signal.

2. The apparatus of claim 1, wherein the bridge has logic for releasing the bridge memory for the transaction responsive to the bridge receiving the at least one certain non-completion signal.

3. The apparatus of claim 1, wherein the first device has logic operable for determining that the first device is at least temporarily unable to receive any of the data for the transaction and for responsively sending a first certain non-completion signal to the bridge, and wherein the bridge responsively sends the first certain non-completion signal to the second device.

4. The apparatus of claim 3, wherein the re-sending responsive to the at least one certain non-completion signal includes re-sending all the data held in the device memory for the transaction responsive to receiving the first certain non-completion signal from the bridge.

5. The apparatus of claim 1, wherein the first device has logic operable for determining that the first device is at least temporarily unable to receive a portion of the data for the transaction and for responsively sending a second certain non-completion signal to the bridge, and wherein the bridge responsively sends the second certain non-completion signal to the second device.

6. The apparatus of claim 5, wherein the re-sending responsive to the at least one certain non-completion signal includes selectively re-sending a portion of the data held in the device memory for the transaction responsive to receiving the second certain non-completion signal from the bridge.

7. The apparatus of claim 1, wherein in the holding of data from the second device, the bridge memory holds sufficient data to enable the sending from the second device and the receiving by the first device at different rates.

8. A method for sending data from a first device to a second device, the method comprising the steps of:
communicating on a bus by a first device according to a first protocol;
communicating on the bus by a second device via a bridge between the bus and the second device, wherein the second device communicates according to a second protocol and the bridge translates from the second protocol to the first protocol;
generating a request by the second device to write data to the first device for a transaction;
sending a certain ready signal by the bridge to the second device responsive to the request and without the bridge first receiving an acknowledgment from the first device that the first device is ready to receive the data;
sending multiple beats of the data by the second device responsive to receiving the certain ready signal and without receiving the acknowledgment from the first device for the write request;
holding, in a device memory of the second device, the data that the second device has sent for the transaction, but for which completion has not been signaled;
re-sending, by the second device, the data held in the device memory responsive to receiving at least one certain non-completion signal;
releasing, by the second device, the device memory for the data responsive to receiving a completion signal; and
determining, by the first device, that the first device is able to receive the data for the transaction and responsively sending the completion signal to the bridge, wherein the bridge responsively sends the completion signal to the second device only in response to the first device sending the completion signal to the bridge, wherein the second device sends the data and the first device receives the data at different rates without the first device signaling the certain non-completion signal and without the second device repeating the data sending, but the second device repeats the data sending in response to the first device signaling the certain non-completion signal.

9. The method of claim 8, comprising the step of releasing the bridge memory for the transaction by the bridge responsive to the bridge receiving the at least one certain non-completion signal.

10. The method of claim 8, comprising the step of determining, by the first device, that the first device is at least temporarily unable to receive any of the data for the transaction and responsively sending a first certain non-completion signal to the bridge, wherein the bridge responsively sends the first certain non-completion signal to the second device.

11. The method of claim 10, wherein the step of re-sending responsive to the at least one certain non-completion signal includes re-sending all the data held in the device memory for the transaction responsive to receiving the first certain non-completion signal from the bridge.

12. The method of claim 8, comprising the step of determining, by the first device, that the first device is at least temporarily unable to receive a portion of the data for the transaction and responsively sending a second certain non-completion signal to the bridge, wherein the bridge responsively sends the second certain non-completion signal to the second device.

13. The method of claim 12, wherein the step of re-sending responsive to the at least one certain non-completion signal includes selectively re-sending a portion of the data held in the device memory for the transaction responsive to receiving the second certain non-completion signal from the bridge.

14. The method of claim 8, wherein in the holding of data from the second device, the budge memory holds sufficient data to enable the sending from the second device and the receiving by the first device at different rates.

15. A computer program product for master target devices that communicate on the bus according to a certain protocol via a bridge between the bus and the devices, wherein the target device communicates according to a second protocol, with the bridge translating from the second protocol to the first protocol, the computer program product comprising computer readable storage media, the storage media comprising:
instructions for generating a request by the master device to write data to the target device for a transaction, wherein the bridge sends a certain ready signal to the master device responsive to the request and without the bridge first receiving an acknowledgment that the target device is ready to receive the data;

instructions for sending multiple beats of the data by the master device responsive to receiving the certain ready signal and without receiving the acknowledgment from the target device for the write request;

instructions for holding, in a device memory of the master device, the data that the master device has sent far the transaction, but for which completion has not been signaled;

instructions for re-sending, by the master device, the data held in the device memory responsive to receiving at least one certain non-completion signal;

instructions for releasing, by the master device, the device memory for the data responsive to receiving a completion signal; and instructions for determining by the target device that the target device is able to receive the data for the transaction, and for responsively sending the completion signal to the bridge, wherein the bridge responsively sends the completion signal to the master device only in response to the target device sending the completion signal to the bridge, wherein the master device sends the data and the target device receives the data at different rates without the target device signaling the certain non-completion signal and without the master device repeating the data sending, but the master device repeats the data sending in response to the target device signaling the certain non-completion signal.

16. The computer program product of claim 15, the storage media comprising:

instructions for determining by the target device that the target device is at least temporarily unable to receive any data for a transaction and for responsively sending a first certain non-completion signal to the bridge, wherein the bridge responsively sends the first certain non-completion signal to the master device.

17. The computer program product of claim 16, wherein the instructions for re-sending responsive to the at least one certain non-completion signal include instructions for re-sending all the data held in the device memory for the target data transaction responsive to receiving the first certain non-completion signal from the bridge.

18. The computer program product of claim 15, the storage media comprising:

instructions for determining by the target device that the target device is at least temporarily unable to receive a portion of the data for the transaction and responsively sending a second certain non-completion signal to the bridge, wherein the bridge responsively sends the second certain non-completion signal to the master device.

19. The computer program product of claim 18, wherein the instructions for re-sending responsive to the at least one certain non-completion signal includes selectively re-sending a portion of the data held in the device memory for the transaction responsive to receiving the second certain non-completion signal from the bridge.

20. The computer program product of claim 15, wherein in the holding of data from the second device, the bridge memory holds sufficient data to enable the sending from the second device and the receiving by the first device at different rates.

* * * * *